(12) United States Patent
Nunally

(10) Patent No.: US 7,191,134 B2
(45) Date of Patent: Mar. 13, 2007

(54) AUDIO PSYCHOLOGICAL STRESS INDICATOR ALTERATION METHOD AND APPARATUS

(76) Inventor: Patrick O'Neal Nunally, 2227 Villa Verde Rd., Escondido, CA (US) 92029

( * ) Notice: Subject to any disclaimer, the term of this patent is extended or adjusted under 35 U.S.C. 154(b) by 943 days.

(21) Appl. No.: 10/106,993

(22) Filed: Mar. 25, 2002

(65) Prior Publication Data

US 2003/0182116 A1 Sep. 25, 2003

(51) Int. Cl.
*G10L 21/00* (2006.01)
*A61B 5/16* (2006.01)

(52) U.S. Cl. ............... 704/270; 704/273; 704/278

(58) Field of Classification Search ........... 704/268, 704/269, 270, 272, 273, 278
See application file for complete search history.

(56) References Cited

U.S. PATENT DOCUMENTS

| | | | | |
|---|---|---|---|---|
| 3,855,417 A | * | 12/1974 | Fuller | 704/272 |
| 3,855,418 A | * | 12/1974 | Fuller | 704/272 |
| 3,971,034 A | | 7/1976 | Bell, Jr. et al. | |
| 4,142,067 A | * | 2/1979 | Williamson | 704/258 |
| 5,774,850 A | * | 6/1998 | Hattori et al. | 704/250 |
| 5,911,129 A | * | 6/1999 | Towell | 704/270.1 |
| 5,976,081 A | * | 11/1999 | Silverman | 600/300 |
| 6,055,501 A | * | 4/2000 | MacCaughelty | 704/272 |
| 6,336,092 B1 | * | 1/2002 | Gibson et al. | 704/268 |
| 6,427,137 B2 | * | 7/2002 | Petrushin | 704/273 |
| 6,523,008 B1 | * | 2/2003 | Avrunin et al. | 704/273 |
| 6,615,174 B1 | * | 9/2003 | Arslan et al. | 704/270 |
| 6,638,217 B1 | * | 10/2003 | Liberman | 600/300 |
| 6,697,457 B2 | * | 2/2004 | Petrushin | 379/88.08 |
| 6,804,649 B2 | * | 10/2004 | Miranda | 704/258 |
| 2002/0198707 A1 | * | 12/2002 | Zhou | 704/231 |

OTHER PUBLICATIONS

McClure et al., "A system and method for enhanced psychophysiological detection of deception," 36th Annual 2002 International Carnahan Conference on Security Technology, 2002, Oct. 20-24, 2002, pp. 50 to 59.*

Gadallah et al., "Speech based automatic lie detection," Proceedings of the Sixteenth National Radio Science Conference, 1999. NRSC '99. Feb. 23-25, 1999, pp. C33/1 to C33/8.*

* cited by examiner

*Primary Examiner*—Martin Lerner

(57) ABSTRACT

A method of changing psychological stress indices by evaluating manifestations of physiological change in the human voice wherein the utterances of a subject under examination are formatted as electrical signals and processed to alter selected characteristics which have been found to change with psycho-physiological state changes, such that the resultant output data signals are perceptually unchanged yet display none of the undesired physiological response characteristics. Apparatus for performing changes of this type includes a data input port, means for spectral alteration and a data output port.

29 Claims, 5 Drawing Sheets

AUDIO PSYCHOLOGICAL STRESS INDICATOR ALTERATION METHOD AND APPARATUS

FIELD OF THE INVENTION

This invention relates to a method of altering psychological stress indicators within audio and to an apparatus for accomplishing the method.

BACKGROUND OF THE INVENTION

Throughout history, various studies have recognized the fact that there is a relationship between psychological stress and changes in physiological states. One manner in which this relationship has been employed is in the causation of programmed response to psychological stimuli, a technique that has most notably been documented by Pavlov in his experiments with conditioned responses. Essentially the same characteristics have provided some basis for the development of techniques in such diverse fields as applied psychology, advertising and hypnotism. Although the existence of this aspect of the psycho-physiological relationship is well recognized, it is only indirectly involved with the present invention.

The second general type or category of the psycho-physiological relationship, which is of more direct interest to the present invention, involves the recognition and identification of physiological changes, which occur when the psychological changes take place. This approach is used more often in medical and psychological research and diagnosis, and in lie detection.

If the physiological manifestations of a change in psychological state are sufficiently great, it is possible for some subjective evaluations to be made by observation by a trained observer. However, far more accurate evaluation can be made by instrumentation designed to detect and measure relatively small degrees of physiological change. Those physiological changes most usually considered are brain wave patterns, heart activity, skin conductivity and breathing activity.

While the measurement of these activities does provide a far more accurate evaluation of physiological response than direct unaided observation, it introduces several disadvantages. The most functionally serious of these problems is the artificiality of the testing situation caused largely by the previous requirement that sensors be attached to the person who is the subject of the examination. In addition, techniques heretofore used have generally required a controlled environment with resultant restrictions on the normal activity of the subject. These requirements can be expected to induce a psychological "set" in the subject which, in some cases, may be as strong as, or stronger than, the psychological set which is to be evaluated, thereby substantially reducing the validity of the evaluation.

An object of the present invention is to provide a method of removing audio psychological stress indicators by detecting and altering manifestations of physiological changes wherein the traditional restraints are minimized or eliminated to the extent that, in most cases, the subject need not be concerned that he is being examined.

A further object of the invention is to mask the human voice medium such that natural changes in physiological state in response to psychological stress are rendered undetectable.

A further object is to provide an apparatus for providing a real-time variation of those naturally occurring characteristics of the human voice by which physiological changes can be recognized and from which the existence of psychological stress can be determined.

BRIEF SUMMARY OF THE INVENTION

Briefly described, the method of the invention includes the steps of acquiring oral utterances of a subject in an electronically malleable medium and identifying frequency components of the oral utterances, which can be interpreted as physiological manifestations indicative of the psychological stress. Once identified the frequency components indicating the physiological state changes are dynamically modulated such that infrasonic variations between utterances of a subject are altered thereby normalizing infrasonic frequency variations such that resultant output signals are audibly indistinguishable from the input signals however upon subsequent analysis are indicative of non-stress (truth).

The apparatus of the invention includes a means for receiving representations of oral utterances of a subject as electrical signals, means for converting the frequency modulations in those electrical signals to numeric relative magnitudes, and then selectively time varying and modulating signal segments effectively normalizing the relative frequency modulations thus masking the indication of psychological stress.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF A PREFERRED EMBODIMENT

Figure 1:
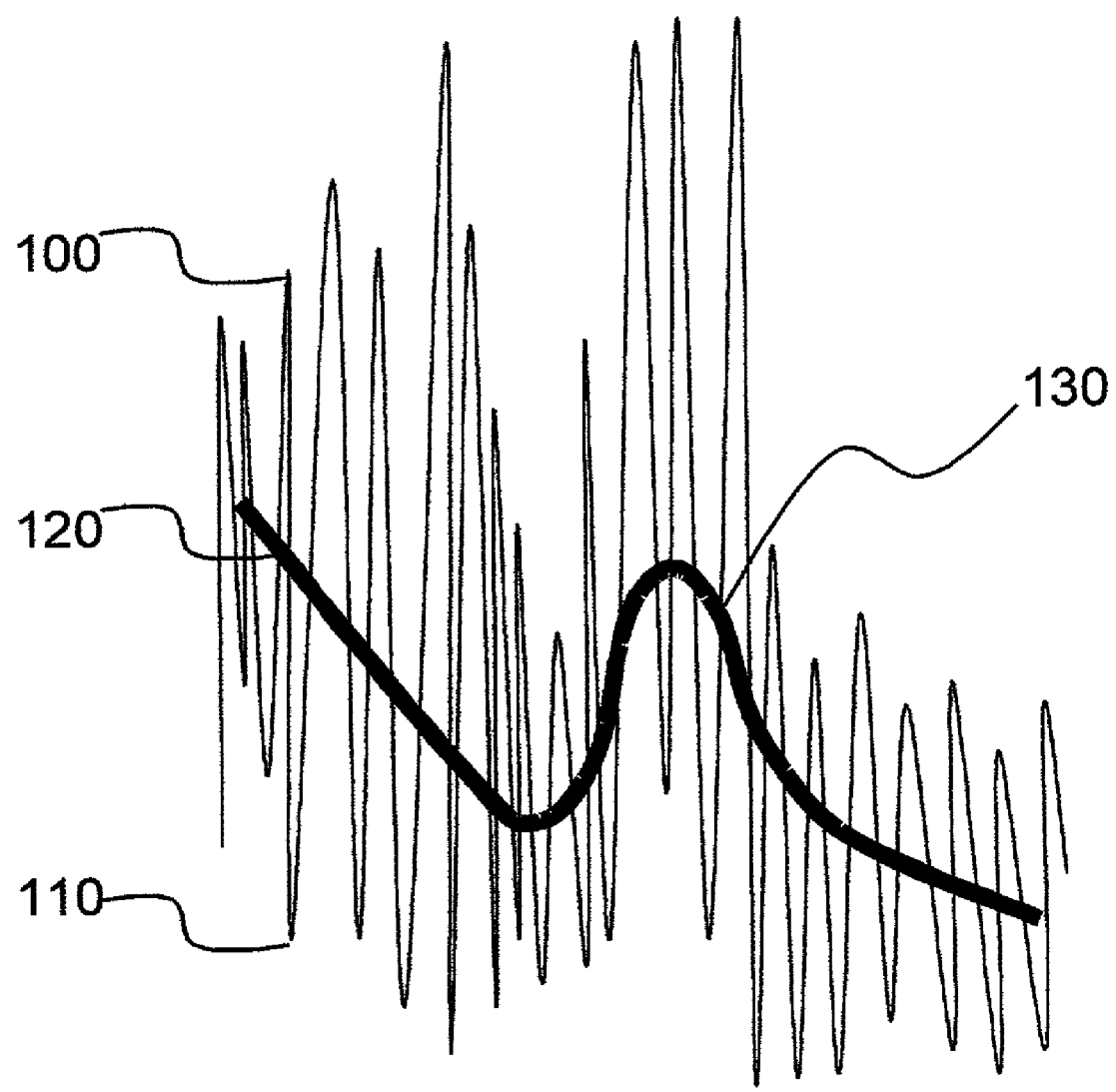
FIGS. 1 and 2 are representative of signals in accordance with the invention and illustrating one aspect thereof.

The so-called voice vibrato has been established as a semi-voluntary response which might be of value in studying deception along with certain other reactions; such as respiration volume; inspiration-expiration ratios; metabolic rate; regularity and rate of respiration; association of words and ideas; facial expressions; motor reactions; and reactions to certain narcotics. No useable technique has been developed previously which permits a valid removal of key metrics of voice changes which otherwise could be used in the determination of a subject's emotional state, opinions, or attempts to deceive.

Early experiments involving attempts to correlate voice quality changes with emotional stimuli have established that human speech is affected by strong emotion. It has been established that these changes are directly related to the functioning of the autonomic nervous system. In fact, detectable changes in the voice occur much more rapidly, following stress stimulation, than do the classic indications of physiological manifestations resulting from the functioning of the autonomic nervous system.

Two types of voice change are directly consequential of stress. The first of these is referred to as the gross change, which usually occurs only as a result of a substantially stressful situation. This change manifests itself in audible perceptible changes in speaking rate, volume, voice tremor, change in spacing between syllables, and a change in the fundamental pitch or frequency of the voice. This gross change is subject to conscious control, at least in some subjects, when the stress level is below that of a total loss of control.

The second type of voice change is that of voice quality. This type of change is not discernible to the human ear, but is an unconscious manifestation of the slight tensing of the vocal cords under even minor stress, resulting in a dampening of selected frequency variations. When graphically portrayed, the difference is readily discernible between unstressed or normal vocalization and vocalization under mild stress, attempts to deceive, or adverse attitudes. These patterns have held true over a wide range of human voices of both sexes, various ages, and under various situational conditions. This second type of change is not subject to conscious control.

As previously understood, there are two types of sound produced by the human vocal anatomy. The first type of sound is a product of the vibration of the vocal cords, which, in turn, is a product of partially closing the glottis and forcing air through the glottis by contraction of the lung cavity and the lungs. The frequencies of these vibrations can vary generally between 100 and 300 Hertz, depending upon the sex and age of the speaker and upon the intonations the speaker applies. This sound has a rapid decay time.

The second type of sound involves the formant frequencies. This constitutes sound, which results from the resonance of the cavities in the head, including the throat, the mouth, the nose and the sinus cavities. This sound is created by excitation of the resonant cavities by a sound source of lower frequencies, in the case of the vocalized sound produced by the vocal cords, or by the partial restriction of the passage of air from the lungs, as in the case of unvoiced fricatives. Whichever the excitation source, the frequency of the formant is determined by the resonant frequency of the cavity involved. The formant frequencies appear generally about 800 Hertz and appear in distinct frequency bands, which correspond to the resonant frequency of the individual cavities.

The first, or lowest, formant is that created by the mouth and throat cavities and is notable for its frequency shift as the mouth changes its dimensions and volume in the formation of various sounds, particularly vowel sounds. The highest formant frequencies are more constant because of the more constant volume of the cavities. The formant waveforms are ringing signals, as opposed to the rapid decay signals of the vocal cords. When voiced sounds are uttered, the voice waveforms are imposed upon the formant waveforms as amplitude modulations.

It is also known that a third signal category exists in the human voice and that this third signal category is related to the second type of voice change discussed above. This is an infrasonic, or subsonic, frequency modulation, which is present, in some degree, in both the vocal cord sounds and in the formant sounds. This signal is typically between 8 and 12 Hertz. Accordingly, it is not audible to the human ear. Because of the fact that this characteristic constitutes frequency modulation, as distinguished from amplitude modulation, it is not directly discernible on time-base/amplitude, this infrasonic signal is one of the more significant voice indicators of psychological stress.

There are in existence several analogies, which are used to provide schematic representations of the entire voice process. Both mechanical and electronic analogies are successfully employed, for example, in the design of computer voices. These analogies, however, consider the voiced sound source (vocal cords) and the walls of the cavities as hard and constant features. However, both the vocal cords and the walls of the major formant-producing cavities constitute, in reality, flexible tissue, which is immediately responsive to the complex array of muscles, which provide control of the tissue. Those muscles, which control the vocal cords through the mechanical linkage of bone and cartilage, allow both the purposeful and automatic production of voice sound and variation of voice pitch by an individual. Similarly, those muscles, which control the tongue, lips and throat, allow both the purposeful and the automatic control of the first formant frequencies. Other formants can be affected similarly to a more limited degree.

It is worthy of note that, during normal speech, these muscles are performing at a small percentage of their total work capability. For this reason, in spite of their being employed to change the position of the vocal cords and the positions of the lips, tongue, and inner throat walls, the muscles remain in a relatively relaxed state. It has been determined that during this relatively relaxed state a natural muscular undulation occurs typically at the 8–12 Hertz frequency previously mentioned. This undulation causes a slight variation in the tension of the vocal cords and causes shifts in the basic pitch frequency of the voice. Also, the undulation varies slightly the volume of the resonant cavity (particularly that associated with the first formant) and the elasticity of the cavity walls to cause shifts in the formant frequencies. These shifts about a central frequency constitute a frequency modulation of the central or carrier frequency.

It is important to note that neither of the shifts in the basic pitch frequency of the voice or in the formant frequencies is detectable directly by a listener, partly because the shifts are very small and partly because they exist primarily in the inaudible frequency range previously mentioned.

In order to observe this frequency modulation any one of several existing techniques for the demodulation of frequency modulation can be employed, bearing in mind, of course, that the modulation frequency is the nominal 8–12 Hertz and the carrier is one of the bands within the voice spectrum.

Detection and metric measurements of these frequency modulations via demodulation provides input to dynamic modulation processes, which include re-sampling and normalization such that areas of frequency modulation initially indicative of physiological manifestations of psychological stress are altered such that they are no longer indicative of physiological manifestations of psychological stress.

An example of the infrasonic variations discussed above can be observed in FIG. 1, which shows an electrical signal resulting from a sampled voice of a normal unstressed subject. The figure depicts the pulses of the amplitude modulation of formants by a voiced signal of approximately 190 Hertz, the variations that appear as amplitude variations in FIG. 1 being amplitude representations of frequency modulation.

In order to more fully understand the representation of FIG. 1, the concept of a "center of mass" of this waveform must be understood. It is possible to approximately determine the midpoint between the two extremes as the waveform of FIG. 1 was drawn. If the midpoints between extremes of all excursions are marked and if those midpoints are then approximately joined by a continuous curve, it will be seen that a line approximating an average or "center of mass" of the entire waveform will result. For example, the midpoint of the excursion between the peaks identified as 100 and 110 in FIG. 1 is marked at 120. Joining all such marks, with some smoothing, results in the smooth curved line 130 in FIG. 1. The line 130 represents the infrasonic frequency modulation resulting from the undulations previously described.

As mentioned above, it has been determined that the array of muscles associated with the vocal cords and cavity walls is subject to mild muscular tension when slight to moderate psychological stress is created. This tension, indiscernible to the subject and similarly indiscernible by normal unaided observation techniques, is filterable based on a selectively varied modulation to a degree sufficient to decrease or virtually eliminate the embedded frequency modulation variance such that the resultant output is consistent with muscular undulations present in the unstressed subject, thereby removing the basis for the carrier frequency variations which produce notable infrasonic frequency modulations.

Figure 2:
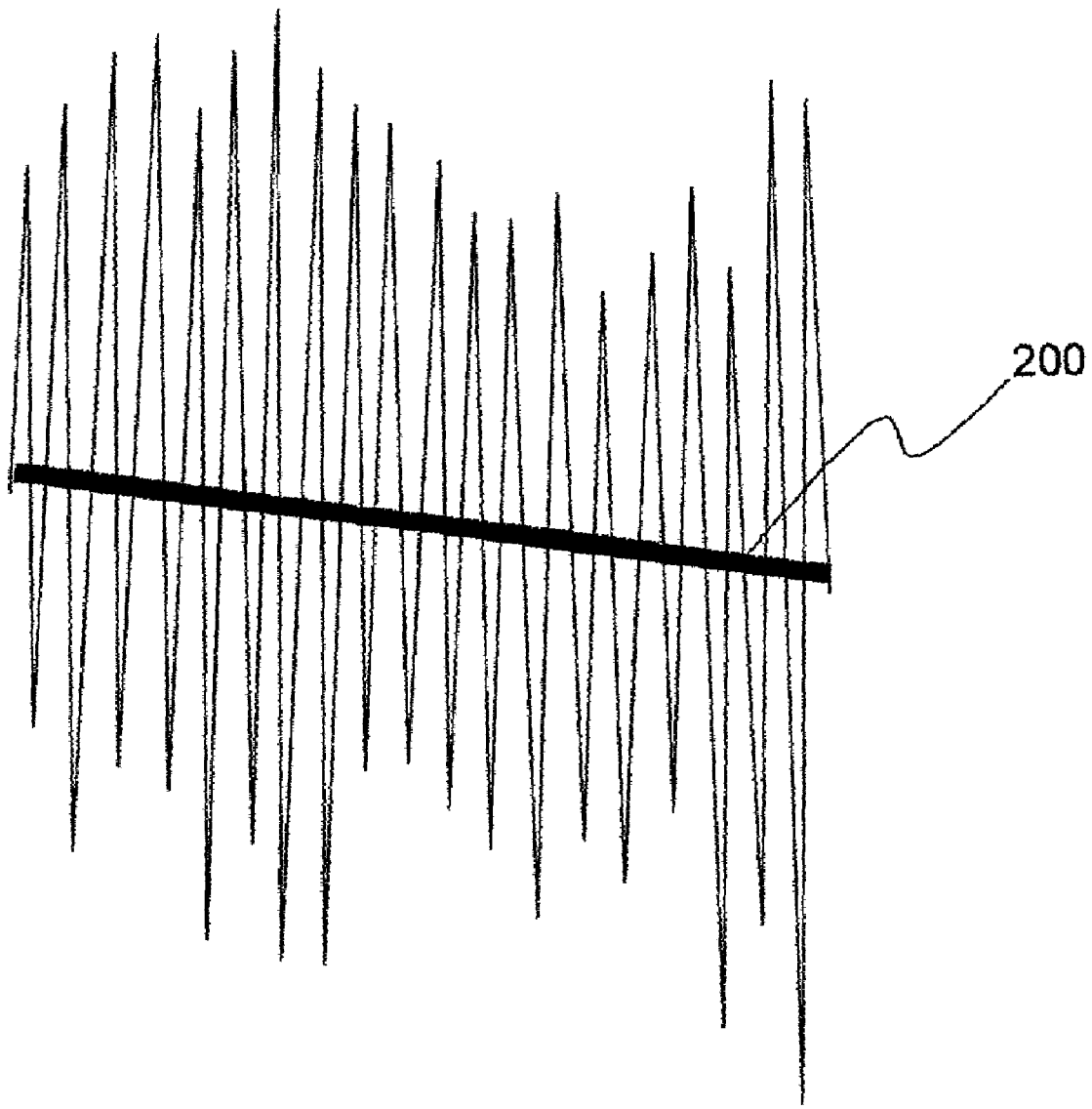

FIG. 2 depicts an utterance similar to that of FIG. 1 but at a time of induced psychological stress. In this case, the center of mass waveform can be seen to be essentially devoid of the infrasonic variations observed in the unstressed utterance in FIG. 1, even though all other test factors and the demodulation procedures were held constant. For convenience, the center of mass is approximately indicated in FIG. 2 by line 200.

Figure 3:
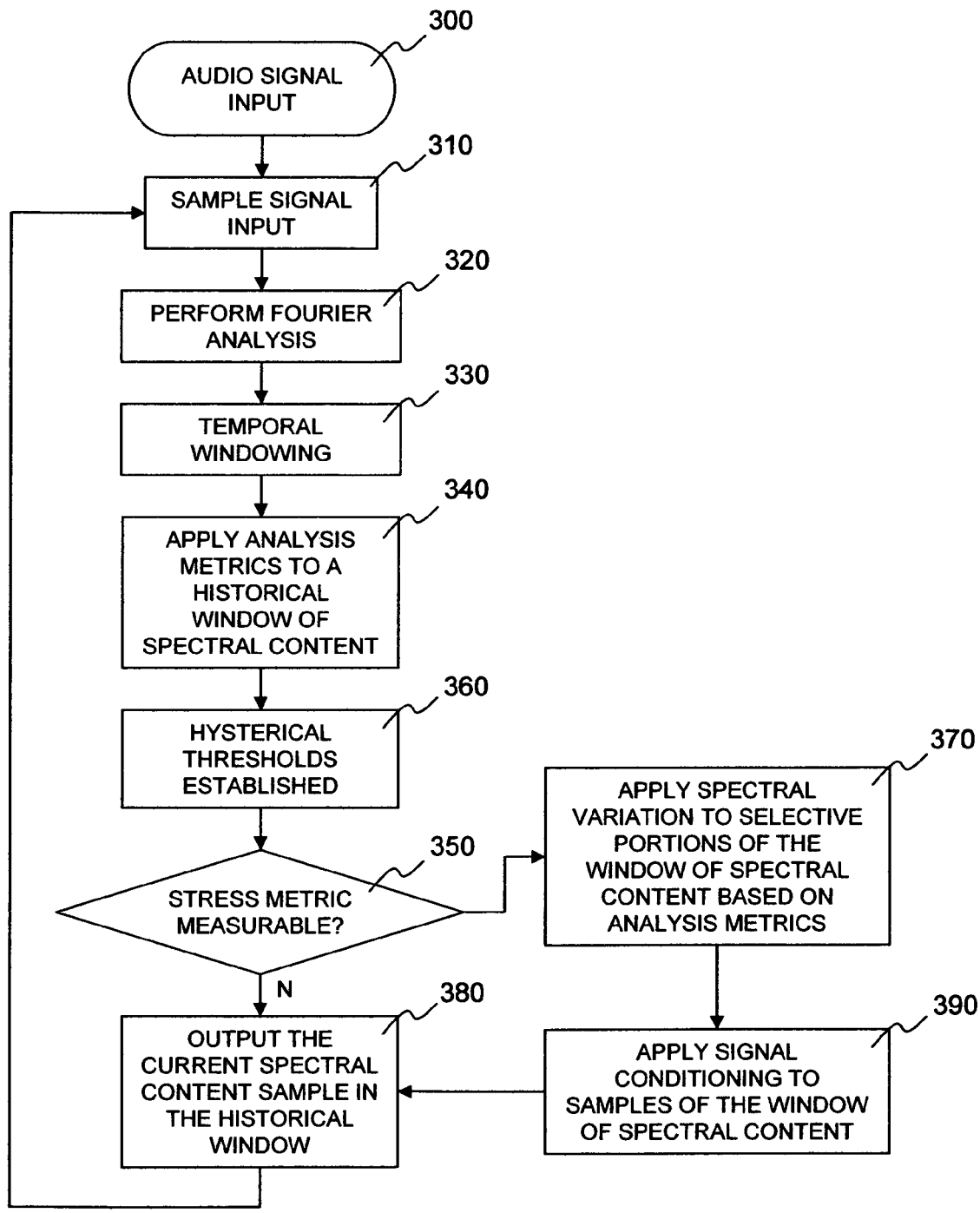
FIG. 3 is representative of processes in accordance with an embodiment of the method of the invention and illustrating aspects thereof.

FIG. 3 depicts one embodiment of the invention. Audio signals are presented in a digital form 300. It is anticipated that in other embodiments of the invention signal information may be presented in analog form or as compressed or preformatted digital data. Once signal data is received it is sampled 310 in the preferred embodiment at 8 Bit sample sizes with a 11.025 kHz sampling rate. Alternate embodiments may make use of different sampling rates and sizes to achieve greater accuracy or to lower cost for specific applications. Once sampled signal data is decomposed based on spectral decomposition processing techniques 320. In the preferred embodiment this decomposition 320 is accomplished using a plurality of discrete Fourier transforms. Alternate embodiments make use of non-discreet (often called Fast Fourier Transforms (FFTs)) and in yet another embodiment decomposition of the signal is accomplished using Wavelet transformations. In the invention's preferred embodiment signal data is organized for temporal spectral measurability in fixed windows of time defining a fixed data size of 2048 bits and hysteresis of 16 bits for each of these metrics is affected 330. In the preferred embodiment decomposed spectral data is numerically analyzed 340 for characteristics of psychological stress particularly transitions in the presence of 8–12 Hz normalized magnitude components. In other embodiments decomposed spectral data is additionally numerically analyzed 340 for characteristics of psychological stress particularly transitions in a narrow band of higher frequency components, or "tremolo". In other embodiments decomposed spectral data is numerically analyzed 340 for characteristics of psychological stress particularly transitions in frequency components associated with counter homeostasis oscillation perturbation signals. The collective metrics gathered from the data window are compared to a series of scaled data heuristics, which are used to establish the magnitude of infrasonic frequency 350. In the preferred embodiment dual thresholds are established for the transition of psychological stress particularly transitions in the presence of normalized 8–12 Hz magnitude components and 360. As will be understood by those skilled in the art hysteresis establishes dual thresholds for each metric of magnitude and time. If data in the window does not cross the pre-established threshold of stress metrics then sampled data is passed unaltered to the output buffer 380. If data in the window is greater than the pre-established threshold of stress metrics then the data sample is spectrally altered 370. In the preferred embodiment this spectral alteration includes modulation of the data sample as a component of the data window at 10 Hz to a relative magnitude indexed to the degree and speed of crossing of the pre-established thresholds of stress metrics. In the preferred embodiment sampled data, which has been spectrally altered in 370 will be conditioned through integration 390 and is passed to the output buffer 380. In alternate embodiments spectral alteration and subsequent signal conditioning can be accomplished via dynamic time warping, fixed frequency addition, high pass filtering, band-pass filtering, random noise inclusion, variable frequency insertion, spectral mapping as well as numerous other spectral altering and signal conditioning methods or combinations thereof.

Figure 4A:
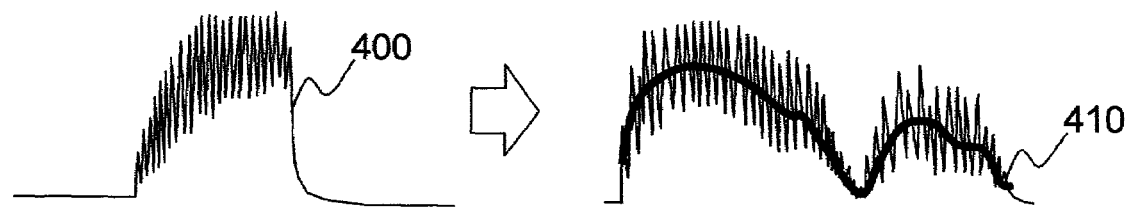
FIGS. 4a–c are illustrations of portions of signal inputs and outputs in a test of an embodiment of the method of the invention and using an embodiment of an apparatus of the invention.
Figure 4B:
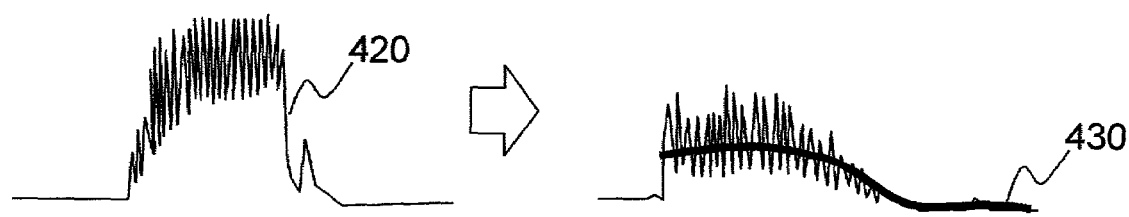
Figure 4C:
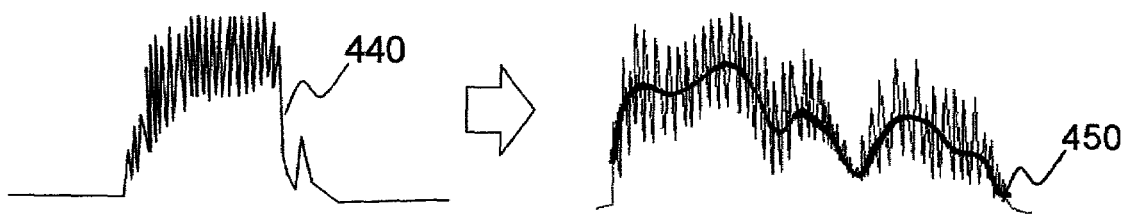

FIGS. 4a, 4b and 4c show representations of portions of responses in a test of the apparatus of the invention. FIG. 4a shows sampled audio input corresponding to the word "yes" 400; and FIG. 4b&c shows a separate sample of the word "yes" where the audio data input 420 & 440 is identical in both FIG. 4b&c. The illustrations exhibit the infrasonic characteristics of the speech, discussed previously. In FIG. 4a, the audio input yields the infrasonic undulation 410 of the type shown in FIG. 1. Alternately, in FIG. 4b (the lie) practically no infrasonic undulation appears 430. However, in FIG. 4c while the input 440 is the same as 4b (a lie) the infrasonic undulation 450 is selectively synthesized by the process of this invention, illustrating an output consistent with stress free audio hence making the lie undetectable. Thus, as has been indicated in the previous examples though the process of this invention, the infrasonic waveform is obvious in the unstressed utterance and is equally obvious in the stressed utterance.

While the above descriptions deal with psycho-physiological relationships from some of the more significant points of view, those who are knowledgeable in these areas will readily recognize the functions of the endocrine glands and sympathetic and parasympathetic nervous systems in completing the interrelationships between the psychological stimulus and the several physiological responses involved in the preprocessing of the present invention. Similarly, while the details of the physiology of the larynx and the resonant cavities of the throat and head have been described only to the point deemed necessary to support the techniques described herein, those persons versed in human physiology will be aware of the well known physical features involved in these areas.

It should be noted that the examples offered in the preferred embodiment explicitly address voice micro-tremor measurements easily detectable by a variety of voice stress analysis instruments. Dektor Counterintelligence and Security Company's psychological stress evaluator (PSE) and the Computer Voice Stress Analyzer (CVSA) introduced in 1988 by Computer Voice Stress Associates are both manufactured to measure the voice micro-tremors. In yet another embodiment of the invention the primary signal processing used to provide voice stress metrics includes a plurality of indices such as a measurement of spikes of roughness, or "tremolo" and processing means for detecting and analyzing counter homeostasis oscillation perturbation signals (CHOPS) in the digitized speech. By including a numerical measure related to these psychological stress indicators a normalized threshold can be established such that the processing of this invention can synthesize a signal output representative of an audio input signal such that the stress indices are no longer detectable in terms of deception detection protocols.

Figure 5:
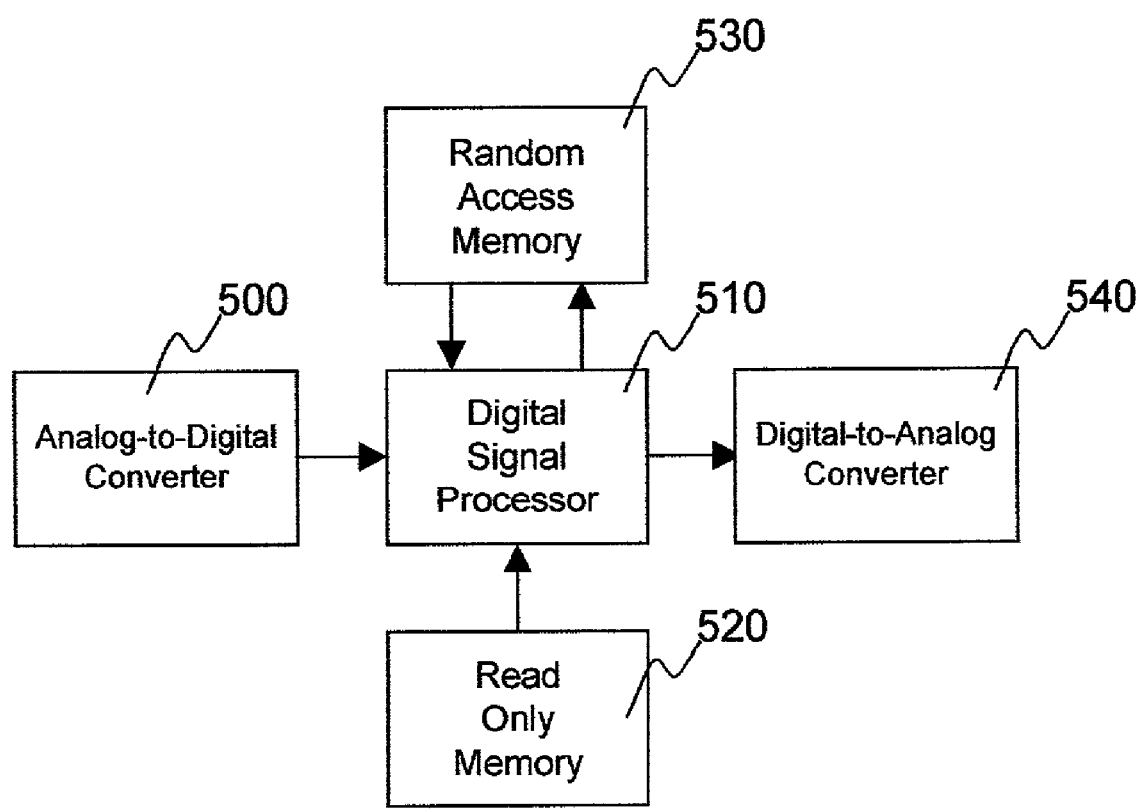
FIG. 5 is a schematic diagram, in block form, of an embodiment of an apparatus in accordance with the invention.

One embodiment of an apparatus in accordance with the invention is shown in FIG. 5 wherein an analog to digital converter 500 converts the sound waves of the oral utterances of a subject into digital electrical signals wherefrom they are connected to a digital signal processor 510 which is simply for the purpose of executing the processes as outlined in FIG. 3.

The sequential process shown in FIG. 3 is stored in a Read-only memory 520 connected to the digital signal processor 510. The digital signal processor 510 is also connected to a random access memory 630 which is used for dynamic storage of transitional values generated in the course of execution of executing the processes as outlined in FIG. 3.

The digital signal processor 510 is additionally connected to a digital to analog converter 540, which provides the output of the apparatus.

It will be recognized that the above described method and apparatus provides a relatively simple technique for filtering psychological stress in audio, which may be subject to examination and can be useful in cleansing audio streams of deception indicators. It will also be recognized that the complete real-time absence of observable indications of involuntary physiological manifestations of psychological stress, permits the apparatus to be used with recipients who do not know that information being provided has been altered to remove identifiable stress indicators making examination of subjects at a remote distance, such as over telephone lines or other communications networks ineffectual. An example of this technique is the processing of oral utterances of a person, or several individuals, appearing on a television program, notably one program in which each of three parties claimed to be a specific individual but only one of the parties was telling the truth. Recordings of the statements by each party, processed in accordance with the method of the present invention on an apparatus such as that shown in FIG. 5, provided recordings from which the individual telling the truth can not be readily identified based in voice stress analysis.

While certain advantageous embodiments have been chosen to illustrate the invention it will be understood by those skilled in the art that various changes and modifications can be made therein without departing from the scope of the invention as defined in the appended claims.

What is claimed is:

1. A method of changing physiological manifestations of psychological stress in a human source audio comprising the steps of: receiving an oral utterance by a subject in the form of electrical signals; and identification of portions of said electrical signals which represent variations in the psychological stress of the voice of the subject; and transformation of said identified portions of audio data into like audio data where the signal segments are transformed via selective variation of frequency domain characteristics such that the presence of stress indicative characteristics are removed from said signal; and providing the electrical signals for use as an electrical representation of audio utterances.

2. An apparatus for producing electrical output signals approximating electrical input signals both representative of oral utterances, which removes indications of involuntary physiological manifestations of psychological stress, the apparatus comprising: means for receiving an input signal representing audio utterances; and processing means for reduction of stress indicators present in said input signal based on no less than one involuntary stress indicating metric of the identified segments of said electrical input signal; and means for providing resultant data as signals representing audio utterances.

3. An apparatus according to claim 2 wherein said processing includes a means for quantifying no fewer than one stress indicia selected from the group consisting of infrasonic frequency, micro-tremor, tremolo and counter homeostasis oscillation perturbation.

4. An apparatus according to claim 2 wherein said processing includes a means for counteracting no fewer than one stress indicia selected from the group consisting of infrasonic frequency, micro-tremor, tremolo and counter homeostasis oscillation perturbation.

5. An apparatus as in any of claims 2–4 wherein a said processing means is a digital signal processor.

6. An apparatus as in any of claims 2–4 wherein a said processing means is a microprocessor.

7. An apparatus as in any of claims 2–4 wherein a processing means is a digital filtering.

8. An apparatus as in any of claims 2–4 wherein a processing means is digital.

9. An apparatus as in any of claims 2–4 wherein a processing means is analog.

10. An apparatus for producing output electrical signals that are representative of electrical input signals where the difference between said input signals and said output signals is the absence in the output signals of indicators of involuntary physiological manifestations of psychological stress, the apparatus comprising the combination of: means for receiving electrical signals representative of oral utterances; and processing means for analyzing said electrical signals to identify involuntary stress indicating characteristics thereof; and additional processing means for altering said stress indicating characteristics of said electrical signals; and means for outputting the altered electrical signals.

11. An apparatus according to claim 10 wherein said processing includes a means for measuring no fewer than one stress indicia selected from the group consisting of infrasonic frequency, micro-tremor, tremolo and counter homeostasis oscillation perturbation.

12. An apparatus according to claim 10 wherein said additional processing includes a means for counteracting no fewer than one stress indicia selected from the group consisting of infrasonic frequency, micro-tremor, tremolo and counter homeostasis oscillation perturbation.

13. An apparatus as in any of claims 10–12 wherein said processing means is a digital signal processor.

14. An apparatus as in any of claims 10–12 wherein said additional processing means is a digital signal processor.

15. An apparatus as in any of claims 10–12 wherein said processing means is a microprocessor.

16. An apparatus as in any of claims 10–12 wherein said additional processing means is a microprocessor.

17. An apparatus as in any of claims 10–12 wherein said processing means is a digital filter.

18. An apparatus as in any of claims 10–12 wherein said additional processing means is a digital filter.

19. An apparatus as in any of claims 10–12 wherein said processing means is digital.

20. An apparatus as in any of claims 10–12 wherein said additional processing means is digital.

21. An apparatus as in any of claims 10–12 wherein said processing means is analog.

22. An apparatus as in any of claims 10–12 wherein said additional processing means is analog.

23. An apparatus for producing an electrical representation of oral utterances of a subject, which does not display observable indications of involuntary physiological manifestations of psychological stress, the apparatus comprising means for receiving electrical signal representations of oral utterances; and processing means for deriving no less than one metric indicative of psychological stress and for synthesis of secondary signal representations where the synthesized secondary signal representations lack stress indicating characteristics; and means for output of said synthesized secondary signal representations.

24. An apparatus according to claim 23 wherein said processing means includes means for selectively varying frequency domain characteristics of said synthesized secondary signal representations from said received electrical signal representations of oral utterances.

25. An apparatus according to claim 2–4, 10–12, or 23 wherein said processing means includes spectral analysis means for identification of frequency modulations representative of the characteristics to be removed from said electrical input signals.

26. An apparatus for producing signals, which are free of indications of involuntary psychological stress manifestations comprising the combination of: means for receiving utterances of a subject as electrical signals; and means for identifying frequency characteristics in said electrical signals and for producing an indication of the degree of presence of no less than one stress indicative component in said electrical signals; and means for varying frequency domain characteristics proportionately to said indication to produce signals having no characteristics associated with indications of involuntary psychological stress.

27. A method of producing data, which is free of indications of involuntary psychological stress manifestations comprising the steps of: receiving utterances of a subject as electrical signals as data; and varying frequency domain characteristics to produce data having no characteristics associated with indications of involuntary psychological stress.

28. An apparatus for producing data, which is free of indications of involuntary psychological stress manifestations comprising the combination of: means for receiving utterances of a subject as electrical signals; and means for identifying frequency characteristics in said electrical signals and for producing an indication of the degree of presence of no less than one stress indicative component in said electrical signals; and means for varying frequency domain characteristics proportionately to said indication to produce signals having no characteristics associated with indications of involuntary psychological stress.

29. An apparatus as in any of claims 2–4, 10–12, 23, 26–28 wherein a randomizer is used to produce signals having characteristics associated with unaltered indications of involuntary psychological stress.

* * * * *